(12) United States Patent
Oiwa et al.

(10) Patent No.: US 8,531,475 B2
(45) Date of Patent: Sep. 10, 2013

(54) COMPUTER-READABLE STORAGE MEDIUM HAVING STORED THEREIN RECEPTION STATUS DISPLAY PROGRAM, INFORMATION PROCESSING APPARATUS, INFORMATION PROCESSING SYSTEM, AND RECEPTION STATUS DISPLAY METHOD

(75) Inventors: Ryota Oiwa, Kyoto (JP); Yousuke Fujino, Kyoto (JP)

(73) Assignee: Nintendo, Co., Ltd., Kyoto (JP)

( * ) Notice: Subject to any disclaimer, the term of this patent is extended or adjusted under 35 U.S.C. 154(b) by 119 days.

(21) Appl. No.: 13/297,604

(22) Filed: Nov. 16, 2011

(65) Prior Publication Data

US 2012/0120094 A1    May 17, 2012

(30) Foreign Application Priority Data

Nov. 17, 2010    (JP) ................................. 2010-257037

(51) Int. Cl.
*G09G 5/02*    (2006.01)
(52) U.S. Cl.
USPC .......................................................... 345/589

(58) Field of Classification Search
USPC .......................................................... 345/589
See application file for complete search history.

(56) References Cited

U.S. PATENT DOCUMENTS

| 5,491,778 A * | 2/1996 | Gordon et al. ................ 345/640 |
| 2007/0192723 A1 * | 8/2007 | Anzelde et al. ............... 715/772 |

FOREIGN PATENT DOCUMENTS

JP    2002-149171    5/2002

* cited by examiner

*Primary Examiner* — Aaron M Richer
*Assistant Examiner* — Vu Nguyen
(74) *Attorney, Agent, or Firm* — Nixon & Vanderhye P.C.

(57) ABSTRACT

An exemplary reception status display apparatus receives a series of data transmitted thereto, and displays, in a stepwise manner, a corresponding image, which is an image corresponding to the series of data, in a predetermined region in a screen, in accordance with a progression of reception of the series of data. Furthermore, during the reception of the series of data, the exemplary reception status display apparatus continuously generates, outside the predetermined region, movement objects each having a color selected from component colors of the corresponding image and moves each movement object toward the predetermined region.

12 Claims, 6 Drawing Sheets

COMPUTER-READABLE STORAGE MEDIUM HAVING STORED THEREIN RECEPTION STATUS DISPLAY PROGRAM, INFORMATION PROCESSING APPARATUS, INFORMATION PROCESSING SYSTEM, AND RECEPTION STATUS DISPLAY METHOD

CROSS REFERENCE TO RELATED APPLICATION

The disclosure of Japanese Patent Application No. 2010-257037, filed on Nov. 17, 2010, is incorporated herein by reference.

FIELD

An exemplary embodiment relates to a computer-readable storage medium having stored therein a reception status display program executed by a computer of an information processing apparatus for displaying a reception status of a series of data transmitted thereto.

BACKGROUND AND SUMMARY

Conventionally, while downloading music data or the like, for example, an approximate remaining time for downloading the music data is displayed or the download progress status is notified by bar indication, based on the received amount of music data. In addition, on the basis of the received amount of music data, an image corresponding to the music data, such as an image of a jacket picture is divided into sixteen pieces (vertically and horizontally divided into four pieces, respectively), and the pieces are displayed piece by piece along with the download progress.

However, screens on which such a download progress status is notified have generally had simple configurations. In addition, in a method in which the image is divided into pieces and displayed piece by piece as described above, although the simplicity of the screen is improved to some extent, the entirety of the screen gives a user an impression that the movement and change occurring in the screen are poor and not interesting.

Thus, features of the exemplary embodiment is to provide a computer-readable storage medium having stored therein a reception status display program which can please a user even during a download process, an information processing apparatus, an information processing system, and a reception status display method.

In order to attain the above features, the exemplary embodiment employs the following configurations.

The reception status display program according to the exemplary embodiment is reception status display program executed by a computer of an information processing apparatus for displaying a reception status of a series of data transmitted thereto, the reception status display program causing the computer to function as: a reception section; a corresponding image display section; and an object moving section. The reception section is configured to receive the series of data transmitted thereto. The corresponding image display section is configured to display, in a stepwise manner, a corresponding image, which is an image corresponding to the series of data, in a predetermined region in a screen, in accordance with a progression of reception of the series of data. The object moving section is configured to continuously generate, outside the predetermined region, movement objects each having a color selected from component colors of the corresponding image and move each movement object toward the predetermined region, during the reception of the series of data by the reception section.

According to the above configuration example, the display which can please the user even while downloading the series of data can be displayed.

In another configuration example, the object moving section may generate the movement object having a color selected from component colors, of the corresponding image, near a boundary between a portion of the corresponding image already displayed and a portion of the corresponding image not yet displayed.

According to the above configuration example, presentation in which the corresponding image is produced in accordance with movement of the movement object is possible.

In still another configuration example, the object moving section may generate the movement object having a color randomly selected from the component colors near the boundary.

According to the above configuration example, since the color for the movement object is randomly selected, a varying screen displaying the reception status can be provided.

In still another configuration example, main data and corresponding image data may be included in the series of data, the reception section may receive and store the corresponding image data in a predetermined storage section prior to a beginning of reception of the main data, and the corresponding image display section may display a corresponding image based on the received corresponding image data in the stepwise manner, in accordance with an accumulated reception amount of the main data.

According to the above configuration example, since the corresponding image is received prior to the reception of the series of data, the color for the movement object can be determined in accordance with the data (the corresponding image) to be received.

In still another configuration example, the object moving section may move the movement object to a boundary position between a portion of the corresponding image already displayed and a portion of the corresponding image not yet displayed, and thereafter delete the movement object that has reached the boundary position, and the corresponding image display section may display the corresponding image line by line, in accordance with the progression of reception of the series of data.

According to the above configuration example, for example, presentation in which the corresponding image is displayed by the movement objects being accumulated can be represented, and presentation without a sense of discomfort is possible.

In still another configuration example, the corresponding image display section may display the corresponding image in the stepwise manner along a direction different from a direction in which the movement object is moved.

According to the above configuration example, for example, the movement object moves from the top downward, and the corresponding image is displayed in a stepwise manner from the bottom upward, and thereby presentation, in which the corresponding image is produced by the movement objects falling and being accumulated, is possible.

In still another configuration example, the corresponding image display section may display the corresponding image in the stepwise manner so that an entirety of the corresponding image is displayed when the reception of the series of data has completed.

According to the above configuration example, since the corresponding image completes when the reception has completed, the progress status of the reception can be intuitively conveyed to the user by how far the corresponding image is displayed.

In still another configuration example, the object moving section may change the number of movement objects to be generated, in accordance with a received amount of the series of data per unit of time.

According to the above configuration example, the user is allowed to comprehend the reception speed and the reception status during download.

In still another configuration example, the reception status display program may cause the computer to further function as a sketch image display section configured to generate, based on the corresponding image, a sketch image which is an image similar to the corresponding image, and display the sketch image in the predetermined region, and the corresponding image display section may display the corresponding image in the stepwise manner as being superimposed onto the sketch image.

According to the above configuration example, the sketch is displayed and the corresponding image is rendered being superimposed on the sketch. Thus, presentation in which the sketch is gradually substantialized is possible. In addition, the user is allowed to comprehend a volume of the entire download.

The information processing apparatus according to the exemplary embodiment is an information processing apparatus for displaying a reception status of a series of data transmitted thereto, the information processing apparatus including; a reception section; a corresponding image display section; and an object moving section. The reception section is configured to receive the series of data transmitted thereto. The corresponding image display section is configured to display, in a stepwise manner, a corresponding image, which is an image corresponding to the series of data, in a predetermined region in a screen, in accordance with a progression of reception of the series of data. The object moving section is configured to continuously generate, outside the predetermined region, movement objects each having a color selected from component colors of the corresponding image and move each movement object toward the predetermined region, during the reception of the series of data by the reception section.

The information processing system according to the exemplary embodiment is an information processing system for displaying a reception status of a series of data transmitted thereto, the information processing system including: a reception section; a corresponding image display section; and an object moving section. The reception section is configured to receive the series of data transmitted thereto. The corresponding image display section is configured to display, in a stepwise manner, a corresponding image, which is an image corresponding to the series of data, in a predetermined region in a screen, in accordance with a progression of reception of the series of data. The object moving section is configured to continuously generate, outside the predetermined region, movement objects each having a color selected from component colors of the corresponding image and move each movement object toward the predetermined region, during the reception of the series of data by the reception section.

An information processing method according to the exemplary embodiment is a reception status display method for displaying a reception status of a series of data transmitted thereto, the reception status display method including: a receiving step; a displaying step; and an object moving step. The receiving step receives the series of data transmitted thereto. The displaying step displays, in a stepwise manner, a corresponding image, which is an image corresponding to the series of data, in a predetermined region in a screen, in accordance with a progression of reception of the series of data. The object moving step continuously generates, outside the predetermined region, movement objects each having a color selected from component colors of the corresponding image and moves each movement object toward the predetermined region, during the reception of the series of data by the receiving step.

According to the exemplary embodiment, a user is pleased even while waiting for a predetermined data to be downloaded.

DETAILED DESCRIPTION OF NON-LIMITING EXAMPLE EMBODIMENTS

Hereinafter, the exemplary embodiment will be described with reference to the accompanying drawings.

Figure 1:
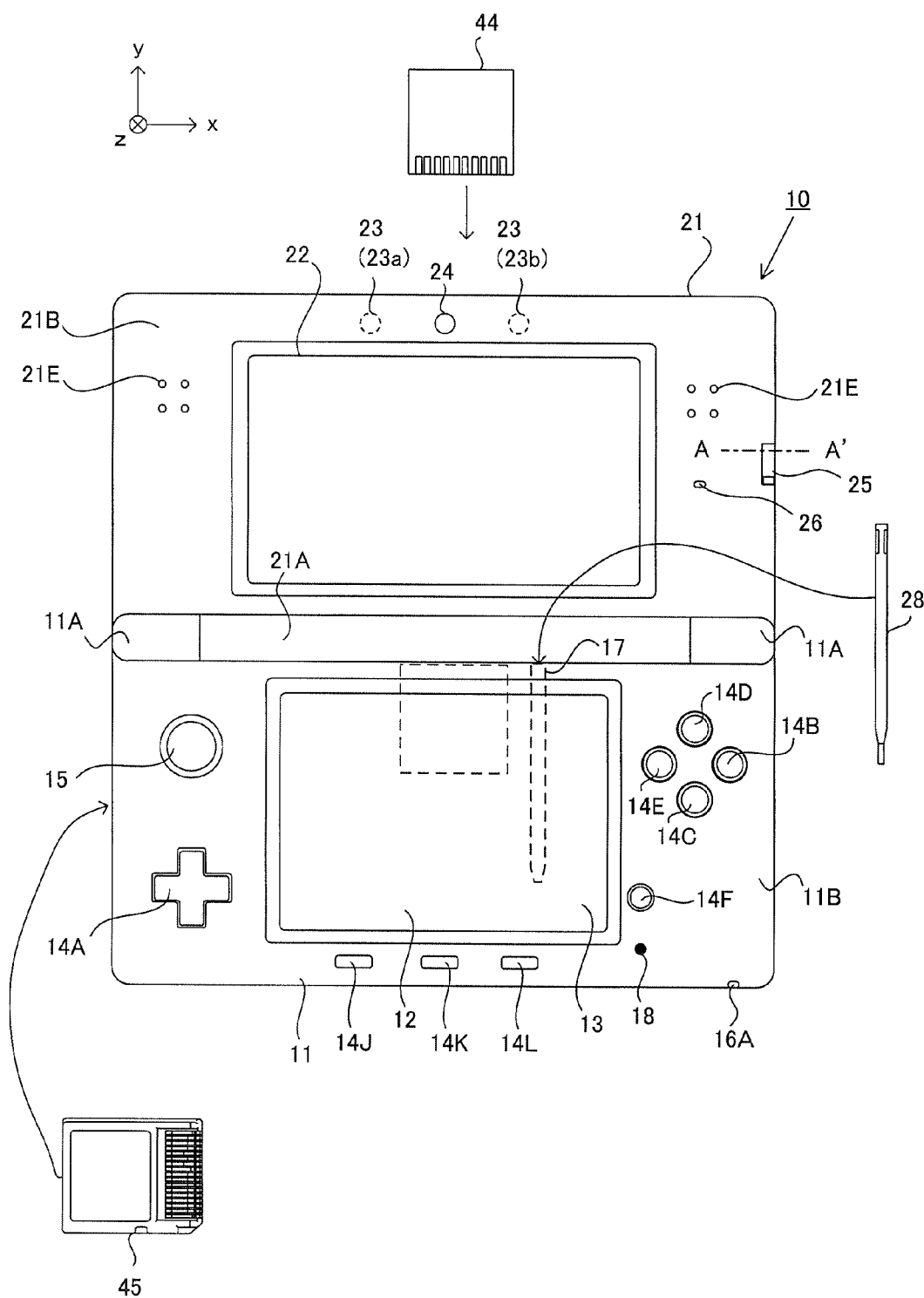
FIG. 1 is an external view of a hand-held game apparatus 10 according to a first embodiment.
Figure 2:
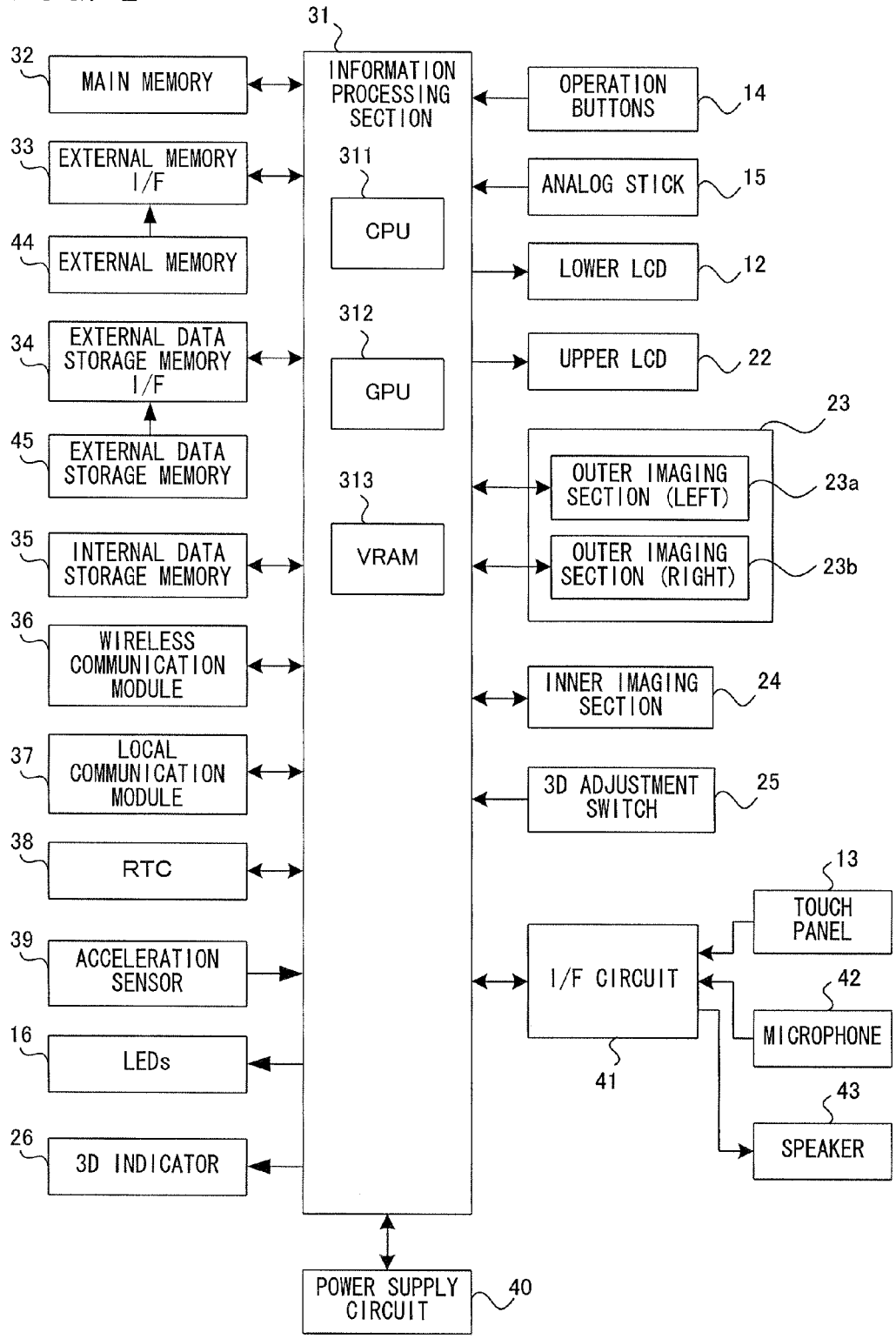
FIG. 2 is a block diagram of the hand-held game apparatus 10 according to the first embodiment.

In FIG. 1, a game apparatus 10 is a foldable hand-held game apparatus in an opened state. The game apparatus 10 is configured to have such a size as to be held by a user with both hands or one hand in the opened state.

The game apparatus 10 includes a lower housing 11 and an upper housing 21. The lower housing 11 and the upper housing 21 are connected to each other so as to be openable and closable (i.e., foldable). In the example of FIG. 1, the lower housing 11 and the upper housing 21 are each formed in a plate-like shape of a horizontally long rectangle, and foldably connected to each other at long side portions thereof. Usually, the user uses the game apparatus 10 in the opened state. When not using the game apparatus 10, the user keeps the game apparatus 10 in a closed state.

In the lower housing 11, a lower LCD (Liquid Crystal Display) 12 is provided. The lower LCD 12 has a horizontally long shape, and is located such that a long side direction thereof corresponds to a long side direction of the lower housing 11. Although an LCD is used as a display device provided in the game apparatus 10 in the exemplary embodiment, any other display devices such as a display device using an EL (Electro Luminescence) and the like may be used. In addition, the game apparatus 10 can use a display device of any resolution.

In the lower housing 11, operation buttons 14A to 14L and a touch panel 13 are provided as input devices. The operation buttons 14A to 14L are each an input device for performing a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided at the inner side surface (the main surface) of the lower housing 11. The cross button 14A is cross-shaped, and includes buttons for indicating up, down, left, right directions. The button 14B, button 14C, button 14D, and button 14E are positioned so as to form a cross shape. The buttons 14A to 14E, the selection button 14J, the HOME button 14K, and the start button 14L are assigned respective functions, as necessary, in accordance with a program executed by the game apparatus 10. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. Any component that enables an analog input by being tilted by a predetermined amount in any direction among up, down, left, right, and diagonal directions may be used as the analog stick 15.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, a microphone hole 18 is provided in the inner side surface of the lower housing 11. Under the microphone hole 18, a microphone, which will be described below, is provided as a sound input device, and the microphone detects a sound from outside of the game apparatus 10.

The operation buttons 14G to 14I are omitted in FIG. 1. For example, the L button 14G is provided at a left end of an upper surface of the lower housing 11, and the R button 14H is provided at a right end of the upper surface of the lower housing 11. The L button 14G and the R button 14H are used, for example, for performing a photographing instruction operation (shutter operation) on the game apparatus 10. In addition, the sound volume button 14I is provided on a left side surface of the lower housing 11. The sound volume button 14I is used for adjusting the sound volume of a speaker of the game apparatus 10.

The game apparatus 10 further includes the touch panel 13 as another input device in addition to the operation buttons 14A to 14K. The touch panel 13 is mounted on the screen of the lower LCD 12. In the exemplary embodiment, for example, a resistive film type touch panel is used as the touch panel 13. However, the touch panel 13 is not limited to the resistive film type touch panel, but any press-type touch panel may be used. Also, in the exemplary embodiment, the touch panel 13 has the same resolution (detection accuracy) as that of, for example, the lower LCD 12. However, the resolution of the touch panel 13 and the resolution of the lower LCD 12 need not be the same. An insertion opening 17 (indicated by dashed lines in FIG. 1) is provided in the upper side surface of the lower housing 11. The insertion opening 17 may be used for accommodating a stylus pen 28 which is used for performing an operation on the touch panel 13. Although an input on the touch panel 13 is usually performed by using the stylus pen 28, a finger of a user may be used for performing an input on the touch panel 13, in addition to the stylus pen 28.

Also, a cover 11C (not shown) is provided at the left side surface of the lower housing 11 in an openable and closable manner. Inside the cover 11C, a connector (not shown) is provided for electrically connecting between the game apparatus 10 and an external data storage memory 45. The external data storage memory 45 is detachably attached to the connector. The external data storage memory 45 is used for, for example, saving (storing) data of an image captured by the game apparatus 10. The connector and the cover section 11C may be provided on the right side surface of the lower housing 11.

Furthermore, an insertion opening 11D, through which an external memory 44 having a game program stored therein is inserted, is provided at the upper side surface of the lower housing 11. A connector (not shown) for electrically connecting between the game apparatus 10 and the external memory 44 in a detachable manner is provided inside the insertion opening 11D (not shown). A predetermined game program is executed when the external memory 44 is connected to the game apparatus 10. The connector and the insertion opening 11D may be provided on another side surface (for example, the right side surface) of the lower housing 11.

Also, a first LED 16A for notifying the user of the power ON/OFF state of the game apparatus 10 is provided at the lower side surface of the lower housing 11, and a second LED 16B (not shown) for notifying the user whether wireless communication of the game apparatus 10 is currently established is provided at the right side surface of the lower housing 11. The game apparatus 10 is capable of performing wireless communication with other devices, and the second LED 16B is lit up while the wireless communication is established. The game apparatus 10 has a function of connecting to a wireless LAN by a method compliant with, for example, IEEE 802.11b/g standard. A wireless switch 19 (not shown) for enabling/disabling the wireless communication function is provided at the right side surface of the lower housing 11.

Meanwhile, in the upper housing 21, an upper LCD 22 is provided. The upper LCD 22 has a horizontally long shape, and is located such that a long side direction thereof corresponds to a long side direction of the upper housing 21. In a similar manner to that of the lower LCD 12, a display device of another type having any resolution may be used instead of the upper LCD 22. A touch panel may be provided so as to cover the upper LCD 22.

Also, the upper housing 21 includes the upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12.

The screen of the upper LCD 22 is provided on the inner side surface (main surface) 21B of the upper housing 21, and the screen of the upper LCD 22 is exposed at an opening of the upper housing 21. The number of pixels of the upper LCD 22 may be, for example, 640 dots×200 dots (the horizontal line× the vertical line). Although the upper LCD 22 is a liquid crystal display device in the exemplary embodiment, a display device utilizing EL (Electro Luminescence) or the like may be used, for example. In addition, a display device having any resolution may be used as the upper LCD 22.

The upper LCD 22 is a display device capable of displaying a stereoscopically visible image. In the exemplary embodiment, the upper LCD 22 is a display device capable of displaying an image which is stereoscopically visible with the naked eye. In the exemplary embodiment, the upper LCD 22 of what is called a parallax barrier type is used. Further, the upper LCD 22 may disable the parallax barrier. When the parallax barrier is disabled, an image can be displayed in a planar manner. Thus, the upper LCD 22 is a display device capable of switching between a stereoscopic display mode for displaying a stereoscopically visible image and a planar display mode for displaying an image in a planar manner (i.e., for displaying a planarly visible image). The switching of the display mode is performed by the 3D adjustment switch 25 acting as a slide switch.

Two imaging sections (23a and 23b) provided at the outer side surface (the back surface reverse of the main surface at which the upper LCD 22 is provided) 21D of the upper housing 21 are collectively referred to as the outer imaging section 23. The outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22.

The inner imaging section 24 is provided at the inner side surface (the main surface) 21B of the upper housing 21, and acts as an imaging section which captures an image in a direction that extends inward from and normal to the inner side surface. The inner imaging section 24 includes an imaging device (such as a CCD image sensor and a CMOS image sensor) having a predetermined resolution, and a lens. The lens may have a zooming mechanism.

The 3D indicator 26 indicates whether the upper LCD 22 is in the stereoscopic display mode. The 3D indicator 26 is an LED, and is lit up when the stereoscopic display mode of the upper LCD 22 is enabled.

Further, speaker holes 21E are formed in the inner side surface of the upper housing 21. A sound from a below-described speaker 43 is outputted through the speaker holes 21E.

(Internal Configuration of Game Apparatus 10)

Figure 6:
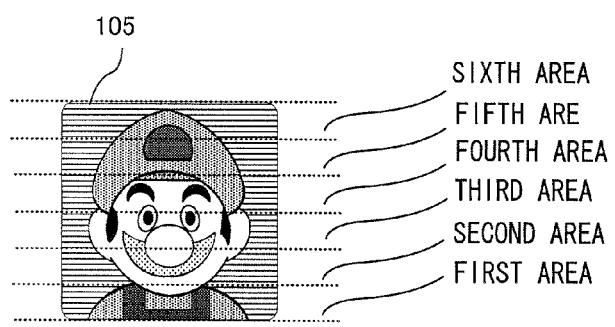
FIG. 6 is a diagram illustrating how a color for a confetti object 103 is determined.

Next, an internal electrical configuration of the game apparatus 10 will be described with reference to FIG. 6. FIG. 6 is a block diagram showing an internal configuration of the game apparatus 10. As shown in FIG. 6, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit board, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby performing processing in accordance with the program. The program executed by the CPU 311 of the information processing section 31 may be obtained from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

The main memory 32, the external memory I/F 33, the external data storage memory I/F 34, and the internal data storage memory 35 are connected to the information processing section 31. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the aforementioned processing based on a program, and temporarily stores a program obtained from outside (i.e., from the external memory 44, another device, or the like), for example. In the exemplary embodiment, for example, a PSRAM (Pseudo-SRAM) is used as the main memory 32.

The external memory 44 is nonvolatile storage means for storing a program executed by the information processing section 31. The external data storage memory 45 is structured as a non-volatile readable and writable memory (for example, a NAND flash memory), and is used for storing predetermined data.

The internal data storage memory 35 is structured as a non-volatile readable and writable memory (for example, a NAND flash memory), and is used for storing predetermined data.

The wireless communication module 36 has a function of connecting to a wireless LAN by a method compliant with, for example, IEEE 802.11b/g standard. The local communication module 37 has a function of performing wireless communication with the same type of game apparatus by a predetermined communication method (for example, communication based on a unique protocol or infrared communication). The wireless communication module 36 and the local communication module 37 are connected to the information processing section 31. The information processing section 31 can perform data transmission to and data reception from another device via the Internet by using the wireless communication module 36, and perform data transmission to and data reception from the same type of another game apparatus by using the local communication module 37.

The acceleration sensor 39 is connected to the information processing section 31. The acceleration sensor 39 detects magnitudes of acceleration (linear acceleration) in directions of respective straight lines along three axes (xyz axes). The acceleration sensor 39 is provided inside the lower housing 11.

The RTC 38 and the power supply circuit 40 are connected to the information processing section 31. The RTC 38 counts time, and outputs the time to the information processing section 31. The information processing section 31 calculates the current time (date) based on the time counted by the RTC 38. The power supply circuit 40 controls power from the power source (i.e., the rechargeable battery accommodated in the lower housing 11 as above described) of the game apparatus 10, and supplies the power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice uttered by a user, and outputs a sound signal to the I/F circuit 41. The amplifier amplifies a sound signal from the I/F circuit 41, and a resultant sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. For example, the sound control circuit performs A/D conversion and D/A conversion on sound signals, and also converts sound signals into a predetermined form of sound data. The touch panel control circuit generates a predetermined form of touch position data based on a signal outputted from the touch panel 13, and outputs the touch position data to the information processing section 31. The touch position data indicates coordinates of a position, on an input surface of the touch panel 13, at which an input has been performed. The touch panel control circuit reads a signal outputted from the touch panel 13 and generates touch position data once in every predetermined period. The information processing section 31 obtains the touch position data to recognize a position, on the touch panel 13, at which an input has been performed.

Operation buttons 14 include the above-described operation buttons 14A to 14L, and are connected to the information processing section 31. The operation buttons 14 output, to the information processing section 31, operation data indicating input states of the respective operation buttons 14A to 14I (i.e., indicating whether the operation buttons 14A to 14I have been pressed). The information processing section 31 obtains the operation data from the operation buttons 14 to perform processing in accordance with the inputs performed via the operation buttons 14.

The lower LCD 12 and the upper LCD 22 are connected to the information processing section 31. The lower LCD 12 and the upper LCD 22 each display an image in accordance with an instruction from (the GPU 312 of) the information processing section 31. In the exemplary embodiment, the information processing section 31 causes the upper LCD 22 to display a stereoscopic image (i.e., a stereoscopically visible image).

The outer imaging section 23 and the inner imaging section 24 are connected to the information processing section 31. The outer imaging section 23 and the inner imaging section 24 each capture an image in accordance with an instruction from the information processing section 31, and output data of the captured image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls lighting-up of the 3D indicator 26. For example, the information processing section 31 lights up the 3D indicator 26 when the upper LCD 22 is in the stereoscopic display mode.

Next, an outline of a process according to the exemplary embodiment will be described. The process of the exemplary embodiment is a process assuming when downloading data from a predetermined server or the like. In the exemplary embodiment, a case is assumed, by way of example, where an application for online shopping is executed in the game apparatus 10 as described above and a user downloads a predetermined game or application purchased by the user.

Figure 3:
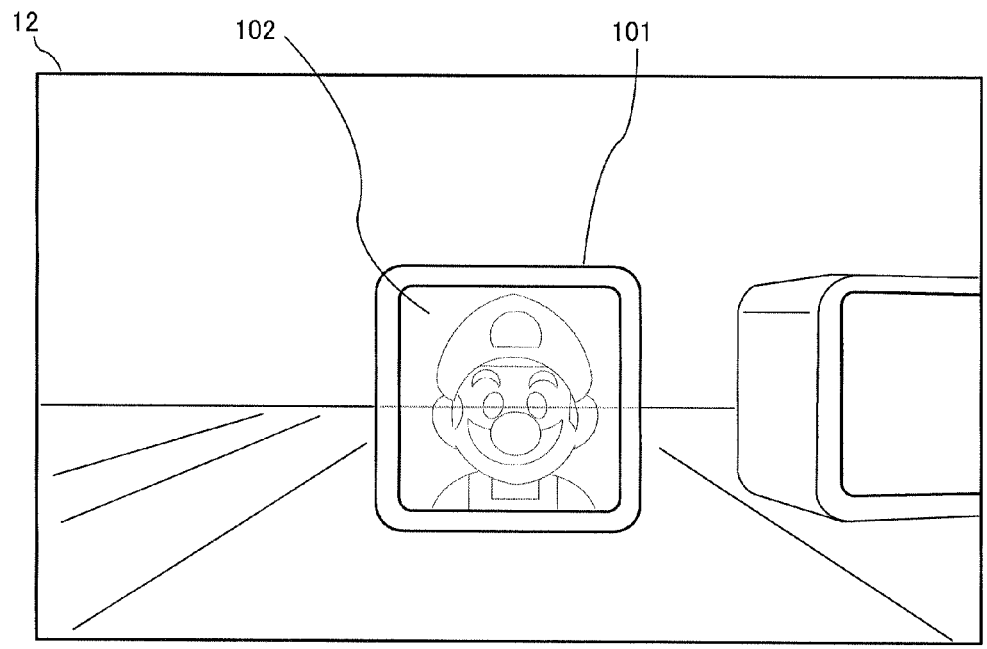
FIG. 3 is an example non-limiting screen according to a download process assumed in the exemplary embodiment.
Figure 4:
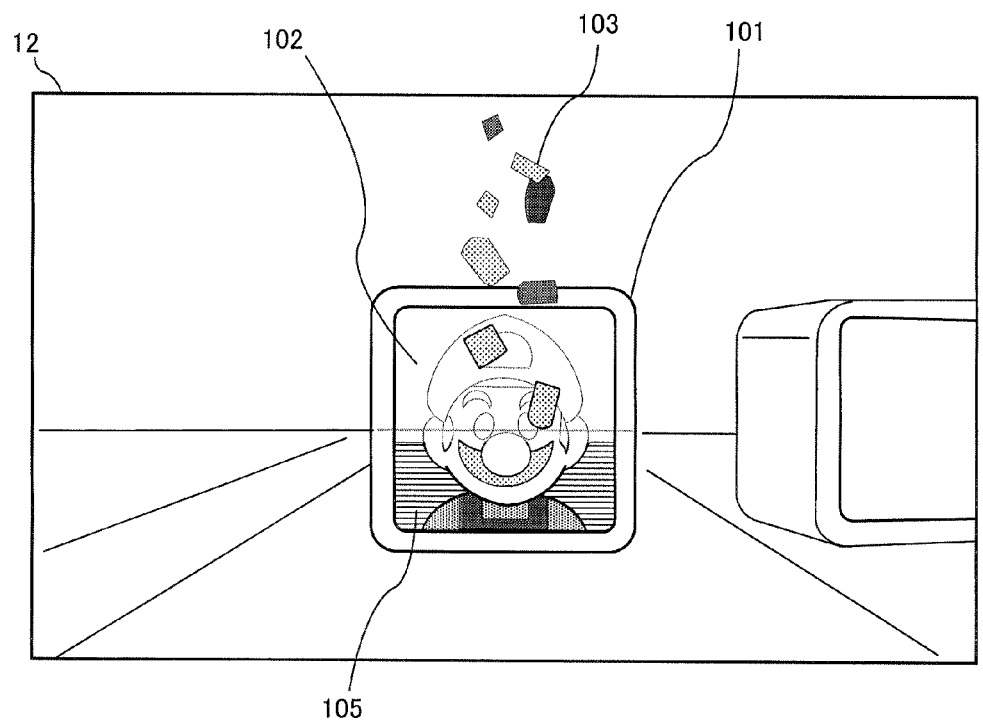
FIG. 4 is an example non-limiting screen according to the download process assumed in the exemplary embodiment.
Figure 5:
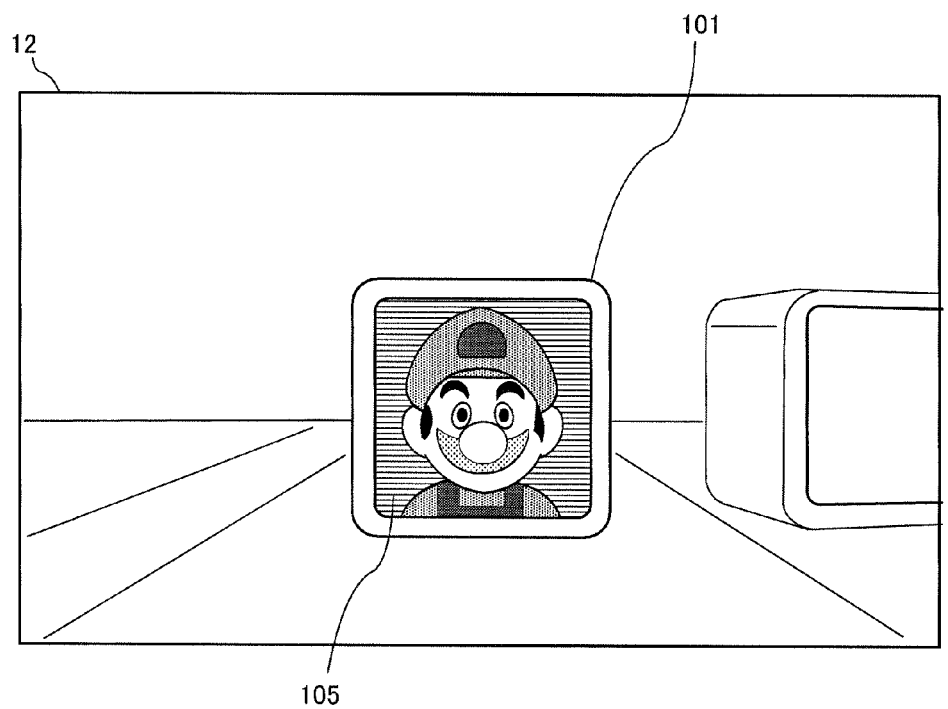
FIG. 5 is an example non-limiting screen according to the download process assumed in the exemplary embodiment.

FIG. 3 to FIG. 5 show diagrams showing examples of a screen according to a download process of the exemplary embodiment. FIG. 3 shows an example of the screen showing the download status displayed on the lower LCD 12 (may also be the upper LCD 22) immediately after the download process begins. In FIG. 3, an icon object 101 having a substantially cubical shape is shown. The icon object 101 is disposed in a virtual three-dimensional space (that is, the screen shown in FIG. 3 is an image taken, of the virtual three-dimensional space, by virtual cameras). An image 102 corresponding to the game or application to be downloaded is shown on (a front surface of) the icon object 101 in FIG. 3. In FIG. 3, the image is displayed in a translucent manner (hereinafter, the image is referred to as translucent image).

After the download begins, as shown in FIG. 4, a state in which a plurality of confetti objects 103 fall from the upper portion of the screen toward the translucent image 102 is displayed. At the same time, the translucent image 102 gradually changes into an opaque image 105 from the bottom portion upward, in accordance with the download progress status (degree of progression). That is, a state in which the opaque image 105 is gradually displayed by the confetti objects 103 being accumulated in the translucent image 102 (presentation such as the translucent image 102 is gradually substantialized) is displayed. Specifically, the opaque image 105 is rendered line by line from the bottom upward. Then, after the download has completed, the entirety of the translucent image 102 is replaced by the opaque image 105 as shown in FIG. 5. The opaque image 105 is an image corresponding to the application or the like being downloaded. Hereinafter, the image is referred to as icon image (the translucent image 102 is an image of the icon image 105 in a translucent manner. Therefore, the size of the image is also the same as that of the icon image 105).

The confetti object 103 disappears when it has reached a boundary portion between the translucent image 102 and the icon image 105. As in the case of FIG. 4, a substantially lower half portion of the translucent image 102 is changed into the icon image 105. As a result, in the state shown in FIG. 4, the confetti object 103 disappears when the confetti object 103 has moved to a position at a very slightly less than halfway position from the top of the translucent image 102 (the boundary between the icon image and the translucent image). For example, the confetti object 103 moves to the lower portion (bottom) of the translucent image 102 immediately after the download begins. The confetti object 103 disappears when it has moved to the upper portion of the translucent image 102 in a state where the download progress is reaching close to the end, for example, when 90% of the translucent image 102 has changed into the icon image 105.

Here, in the exemplary embodiment, there is one color which is used in each confetti object 103. Also, the color of each confetti object 103 is determined based on a color used in the icon image 105. Specifically, the color of the confetti object 103 is determined as follows. For example, supposed that the icon image 105 has a size of 48×48 dots. In this case, first, as shown in FIG. 6, the icon image 105 is equally divided into six areas in the vertical direction. Hereinafter, the areas obtained by the division are referred to as a first area, a second area, a third area, a fourth area, a fifth area, and a sixth area in order starting from the lowest area. Next, a color used in each area is distinguished. For example, a flesh color and red, blue, and orange colors are used in the first area, a flesh color, black, blue, and orange colors, and the like are used in the fourth area. When the download corresponding to each area is in progress, any of the colors used in the area currently being downloaded is used as a color for the confetti object 103. For example, supposed that the total size of data to be downloaded is 48 Mbits. If the data is divided into six pieces, each piece of data has a size of 8 Mbits. Thus, a situation in which 0th Mbit to 8th Mbits of data is downloaded corresponds to downloading of the first area, and a situation in which 8th Mbits to 16th Mbits of data is downloaded corresponds to downloading of the second area. In this case, any of the colors used in the first area is used as the color of the confetti object 103 between when the download begins and when up to 8th Mbits of data is downloaded. Likewise, the color of the confetti object 103 is the same color as any of the colors used in the second area during when the 8th Mbits up to 16th Mbits of data is being downloaded. In other words, the color of the confetti object 103 is the same color as any of the colors used, in the icon image 105, near the boundary between the translucent image 102 and the icon image 105. As a result of such a control, the color of the confetti object 103 dynamically changes between when the download begins and when the download completes, based on the colors used in the icon image 105.

In this manner, in the exemplary embodiment, the icon image 105 is gradually displayed in accordance with the download progress status. In addition, presentation control is also performed so that the icon image 105 is gradually produced by the confetti objects 103 falling and being accumulated. Furthermore, the color of the confetti object 103 is determined based on the icon image 105. This allows, even during a wait time for the download, easy comprehension of the download progress status and displaying of the screen involving change in an image regarding download contents, which creates a distraction to the user.

Figure 7:
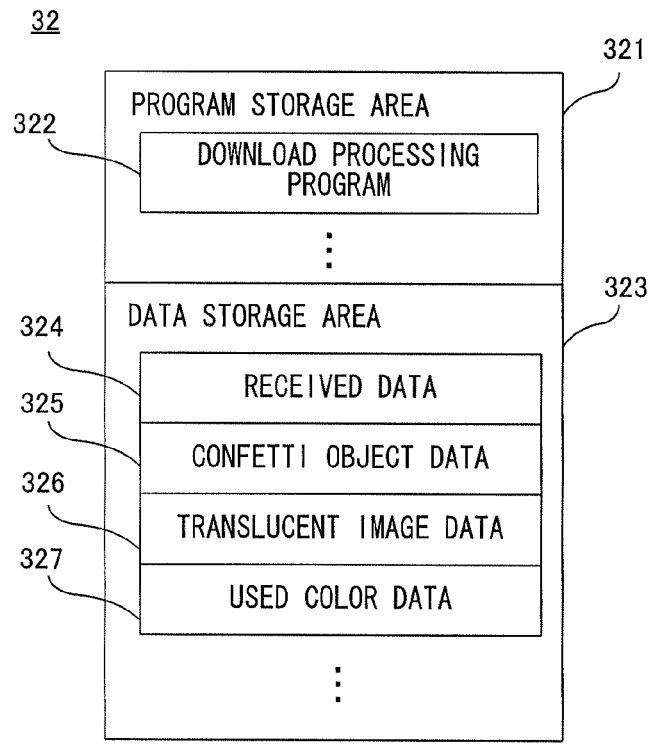
FIG. 7 is a diagram showing a memory map of a main memory 32 of the game apparatus 10.

Next, details of a game process performed by the game apparatus 10 will be described. First, data to be stored in the main memory 32 at the game process will be described. FIG. 7 is a diagram showing a memory map of the main memory 32 of the game apparatus 10. In FIG. 7, the main memory 32 includes a program storage area 321 and a data storage area 323.

In the program storage area 321, a download processing program 322 and the like are stored. The download processing program 322 is a program corresponding to a below-described process of a flowchart shown in FIG. 9.

In the data storage area 323, received data 324, confetti object data 325, translucent image data 326, used color data 327, and the like are stored.

Figure 8:
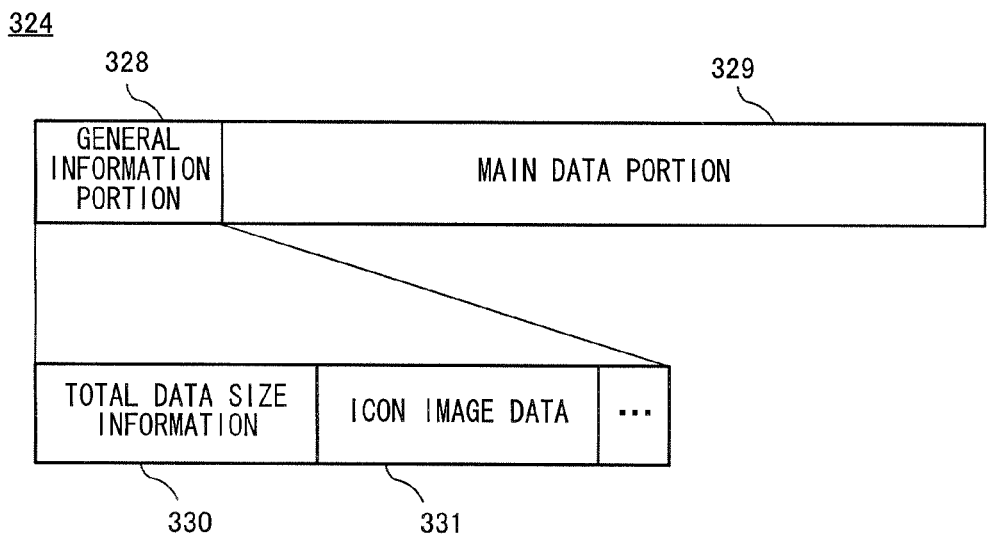
FIG. 8 is an example non-limiting data structure of received data 324.

The received data 324 is data downloaded from the predetermined server or the like, that is, data to be downloaded. The received data 324, as shown in FIG. 8, includes a general information portion 328 and a main data portion 329. The general information portion 328 includes total data size information 330, icon image data 331, other information for downloading the main data portion 329, and the like. The total data size information 330 indicates the total data size of the received data 324. The icon image data 331 is data of the icon image 105. In the exemplary embodiment, the general information portion 328 is transmitted from the server prior to transmission of the main data portion 329. The data size of the general information portion 328 is assumed to be small so as to be downloaded without taking a long time.

In the main data portion 329, data which is a substantial portion of the game or application is stored.

The received data 324 having being received is moved to a storage area or the like for application, accordingly.

Returning to FIG. 7, the confetti object data 325 is data for generating the confetti object 103, and includes polygon data of the confetti object 103 or the like, provided that the color of the confetti object 103 is separately set by a below-described process.

The translucent image data 326 is data of the translucent image 102 as shown in FIG. 3 and the like. The data is generated based on the icon image data 331.

The used color data 327 is data of color used in the icon image 105, and is stored being categorized for each area as described with reference to FIG. 6. In the exemplary embodiment, the icon image 105 is divided into six areas to extract used colors in each of the six areas.

Figure 9:
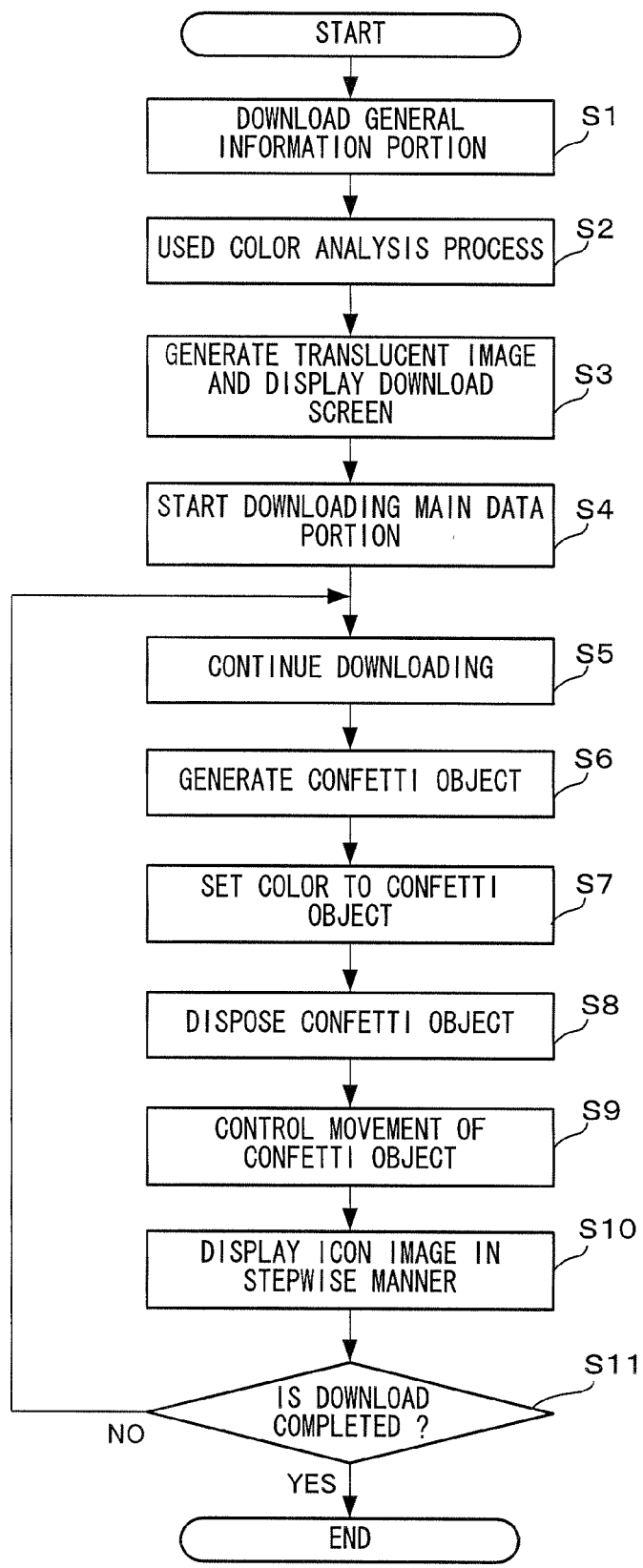
FIG. 9 is a flowchart showing in detail the download process performed by the game apparatus 10.

Next, referring to FIG. 9, details of the download process performed by the game apparatus 10 will be described. FIG. 9 is a flowchart showing in detail the download process performed by the game apparatus 10. Here, it is assumed that selection of data to be downloaded (online shopping process) and the like have already ended, and only the process from the beginning of downloading to the end (completion) will mainly be described.

After the download process begins, first, in step S1, downloading of the general information portion 328 as described above begins. Since the data size of the general information portion 328 is small as described above, this downloading can end without taking a long time.

After downloading of the general information portion 328 ends, next, in step S2, a process of analyzing colors used in the icon image 105 is performed. Specifically, first, the icon image data 331 is acquired from the downloaded general information portion 328. Next, the icon image 105 is generated from the icon image data 331. Furthermore, the icon image 105 is divided into six pieces as shown in FIG. 6. Then, information of colors used in each area is extracted. The extracted color information for each area is stored as the used color data 327 in the main memory 32.

Next, in step S3, on the basis of the icon image data 331, the icon object 101, in which the translucent image 102 is rendered (e.g., attached thereto as a texture), is generated. The icon object 101 is then disposed in the virtual space, an image taken of the virtual space is generated as a download screen, and the download screen is displayed (see FIG. 3).

Next, in step S4, downloading of the main data portion 329 begins.

In the following step S5, downloading of the main data portion 329 continues.

In step S6, the confetti object 103 is generated. Specifically describing the process of step S6, first, a download speed at the point of time is calculated. The download speed is calculated based on, for example, a received amount of main data per a predetermined unit of time (such as an amount of data received in the last 5 seconds). Alternatively, the download speed may be calculated based on an amount of data received up to the present and an elapsed time from the beginning of downloading the main data to the present. Next, reference is made to the confetti object data 325 in the main memory 32 to generate the confetti objects 103 as many as corresponding to the calculated download speed. For example, faster the download speed is, the more confetti objects 103 are generated.

Next, in step S7, a process of setting a color for the generated confetti object 103 is performed. More specifically describing the process of step S7, first, the download progress status is distinguished based on the total data size information 330 included in the general information portion 328 and the size of data downloaded up to the present. Next, an area in accordance with the download progress status is identified in the icon image 105. In the exemplary embodiment, any area among the first to sixth areas shown in FIG. 6 is identified. Furthermore, reference is made to the used color data 327 to acquire information of a color used in the identified area. The used color is then set as a color for the confetti object 103. In the case where there is a plurality of used colors acquired here, one color may be randomly selected therefrom. Alternatively, a most prevalently used color may be selected. The selected one color may then be set as the color for the confetti object 103. Alternatively, a plurality of colors may be randomly selected from a plurality of used colors (e.g., randomly select three colors if there are five used colors) to set as colors for the confetti object 103. Furthermore, when one confetti object 103 is generated in step S6, one of the randomly selected plurality of colors may be randomly determined as the color for the confetti object 103. Alternatively, when a plurality of confetti objects 103 are generated in step S6, the randomly selected plurality of colors may be set as colors for the confetti objects 103 so as to be randomly assigned thereto.

Next, in step S8, a process of disposing the confetti object 103, having the color set thereto by the above process, at a predetermined position in the screen (the virtual space) is performed. Here, it is assumed that the confetti objects which are generated and which have colors set are disposed at substantially central positions at the upper portion of the screen.

Next, in step S9, a movement control process is performed on each confetti object 103 disposed in the screen (the virtual space). Specifically, a motion control is performed by performing physics processing accordingly, so that each confetti object 103 behaves as "fluttering down" toward the icon object 101. Also, regarding the confetti object 103 that has reached the boundary position between the translucent image 102 and the icon image 105 as a result of the movement, a process of deleting the confetti object 103 is also performed.

Next, in step S10, a process of rendering the icon image line by line in accordance with the download progress status is performed. For example, if the total size of data to be downloaded is 48 Mbits, every time 1 Mbit of data is received, the icon image 105 is rendered, being superimposed onto the translucent image 102, line by line starting from the bottom upward.

Next, in step S11, it is determined whether downloading of the main data portion has completed. If the downloading is not completed in result (NO in step S11), the process returns to step S5 and is repeated. On the other hand, after the downloading has completed, the download process according to the exemplary embodiment ends.

In this manner, in the exemplary embodiment, the icon image 105 is acquired prior to downloading of the main data, and the icon image 105 is displayed in a stepwise manner, in accordance with the download progress status. This allows usage of a different icon image 105 for each target to be downloaded, and the user is allowed to be notified by intuition how far the download has progressed. In addition, presentation as if the icon image 105 is produced by moving the confetti objects 103 is performed. Furthermore, the colors of the confetti objects 103 are based on the colors used in the icon image 105. This provides continuous change in the screen even during the wait time for the download, and thereby can create distraction to the user. Furthermore, since the number of confetti objects 103 changes depending on the download speed, the user is allowed to be notified of the download speed in an easy manner.

While, in the above exemplary embodiment, the case is described, by way of example, where the translucent image 102 is displayed at the beginning of downloading and the image gradually changes into the icon image 105, the image is not limited to such a translucent image and another image generated based on the icon image 105 may be displayed. For example, a monochrome image obtained by applying a monochrome effect to the icon image may be displayed. Furthermore, the image corresponding to the translucent image 102 may not be displayed. For example, a control may be carried out such that the confetti objects 103 move to an empty area and there the icon image 105 is gradually displayed.

In the above exemplary embodiment, the case is described, by way of example, where the confetti objects 103 move from top downward and the icon image 105 is rendered from the bottom upward, that is, the icon image 105 is rendered in an opposite direction from the direction of movement of the confetti objects 103. The direction of movement and the direction of rendering are not limited thereto. For example, the confetti objects 103 may move from the left side of the screen toward the icon object 101, and the icon image 105 may be gradually rendered from the bottom upward. That is, the direction of movement of the confetti objects 103 and the direction in which the icon image 105 is displayed in the stepwise manner may be different directions. Furthermore, the both of the directions may be aligned in the same direction. The icon image 105 may be displayed in the stepwise manner so that presentation is provided in which, for example, an image in which the icon image 105 is frozen is displayed instead of the translucent image 102, waterdrop objects are generated instead of the confetti objects 103 and moved, and the image of the frozen icon image 105 gradually melts from the top downward.

Alternatively, while, in the above exemplary embodiment, displaying the icon image 105 in the stepwise manner is controlled in accordance with the download progress status, the icon image 105 may be displayed in the stepwise manner, in accordance with the number of confetti objects 103 to be generated or the number of confetti objects 103 that are moved. Since the number of confetti objects 103 to be generated is in proportion to the download progress status, such a control in accordance with the number of confetti objects 103 to be generated is equivalent to gradually displaying the icon image 105 in accordance with the download progress status.

Alternatively, a region in which the icon image 105 is displayed may not be a portion of the screen (a display region), and the entirety of the screen may be provided for the icon image 105 (in other words, one icon object 101 may be displayed in the entirety of the screen).

Alternatively, for example, if a user performs an action of blowing on the confetti objects 103, the action is detected and presentation may be performed regarding the confetti objects 103 such that each confetti object 103 flutters in accordance with the strength of the blowing.

Alternatively, while, in the above exemplary embodiment, the case is described, by way of example, where the color of each confetti object 103 is made of one color, one confetti object 103 may include a plurality of colors. For example, the confetti object 103 having a squared shape, in which a red color is applied to the half of the surface and a blue color is applied to the remaining half, may be generated. In this case also, the colors used for the confetti object 103 may be the same color as component colors of a corresponding image.

Alternatively, it will be understood that an object having a motif other than the confetti object 103 may be generated and moved, instead of the confetti object 103 in the above exemplary embodiment.

What is claimed is:

1. A non-transitory computer-readable storage medium having stored therein a reception status display program executed by a computer of an information processing apparatus for displaying a reception status of a series of data transmitted thereto, the computer-readable storage medium having stored therein the reception status display program causing the computer to function as:

a reception section configured to receive the series of data transmitted thereto;

a corresponding image display section configured to display, in a stepwise manner, a corresponding image, which is an image corresponding to the series of data, in a predetermined region in a screen, in accordance with a progression of reception of the series of data; and an object moving section configured to continuously generate, outside the predetermined region, movement objects each having a color selected from component colors of the corresponding image and move each movement object toward the predetermined region, during the reception of the series of data by the reception section.

2. The non-transitory computer-readable storage medium having stored therein the reception status display program according to claim 1, wherein the object moving section generates the movement object having a color selected from component colors, of the corresponding image, near a boundary between a portion of the corresponding image already displayed and a portion of the corresponding image not yet displayed.

3. The non-transitory computer-readable storage medium having stored therein the reception status display program according to claim 2, wherein the object moving section generates the movement object having a color randomly selected from the component colors near the boundary.

4. The non-transitory computer-readable storage medium having stored therein the reception status display program according to claim 1, wherein main data and corresponding image data are included in the series of data, the reception section receives and stores the corresponding image data in a predetermined storage section prior to a beginning of reception of the main data, and the corresponding image display section displays a corresponding image based on the received corresponding image data in the stepwise manner, in accordance with an accumulated reception amount of the main data.

5. The non-transitory computer-readable storage medium having stored therein the reception status display program according to claim 1, wherein the object moving section moves the movement object to a boundary position between a portion of the corresponding image already displayed and a portion of the corresponding image not yet displayed, and thereafter deletes the movement object that has reached the boundary position, and the corresponding image display section displays the corresponding image line by line, in accordance with the progression of reception of the series of data.

6. The non-transitory computer-readable storage medium having stored therein the reception status display program according to claim 5, wherein the corresponding image display section displays the corresponding image in the stepwise manner along a direction different from a direction in which the movement object is moved.

7. The non-transitory computer-readable storage medium having stored therein the reception status display program according to claim 1, wherein the corresponding image display section displays the corresponding image in the stepwise manner so that an entirety of the corresponding image is displayed when the reception of the series of data has completed.

8. The non-transitory computer-readable storage medium having stored therein the reception status display program according to claim 1, wherein the object moving section changes the number of movement objects to be generated, in accordance with a received amount of the series of data per unit of time.

9. The non-transitory computer-readable storage medium having stored therein the reception status display program according to claim 1, wherein the reception status display program causes the computer to further function as a sketch image display section configured to generate, based on the corresponding image, a sketch image which is an image similar to the corresponding image, and display the sketch image in the predetermined region, and the corresponding image display section displays the corresponding image in the stepwise manner as being superimposed onto the sketch image.

10. An information processing apparatus for displaying a reception status of a series of data transmitted thereto, the information processing apparatus comprising:

a reception section configured to receive the series of data transmitted thereto;

a corresponding image display section configured to display, in a stepwise manner, a corresponding image, which is an image corresponding to the series of data, in a predetermined region in a screen, in accordance with a progression of reception of the series of data; and an object moving section configured to continuously generate, outside the predetermined region, movement objects each having a color selected from component colors of the corresponding image and move each movement object toward the predetermined region, during the reception of the series of data by the reception section.

11. An information processing system for displaying a reception status of a series of data transmitted thereto, the information processing system comprising:

a reception section configured to receive the series of data transmitted thereto;

a corresponding image display section configured to display, in a stepwise manner, a corresponding image, which is an image corresponding to the series of data, in a predetermined region in a screen, in accordance with a progression of reception of the series of data; and an object moving section configured to continuously generate, outside the predetermined region, movement objects each having a color selected from component colors of the corresponding image and move each movement object toward the predetermined region, during the reception of the series of data by the reception section.

12. A reception status display method for displaying a reception status of a series of data transmitted thereto, the reception status display method comprising the steps of:

receiving the series of data transmitted thereto;

displaying, in a stepwise manner, a corresponding image, which is an image corresponding to the series of data, in a predetermined region in a screen, in accordance with a progression of reception of the series of data; and continuously generating, outside the predetermined region, movement objects each having a color selected from component colors of the corresponding image and moving each movement object toward the predetermined region, during the reception of the series of data by the receiving step.

* * * * *